US008311237B2

(12) United States Patent
Tanaka et al.

(10) Patent No.: US 8,311,237 B2
(45) Date of Patent: Nov. 13, 2012

(54) HOWLING SUPPRESSION APPARATUS AND COMPUTER READABLE RECORDING MEDIUM

(75) Inventors: Hirobumi Tanaka, Hamamatsu (JP); Hiraku Okumura, Hamamatsu (JP)

(73) Assignee: Yamaha Corporation, Hamamatsu-Shi (JP)

( * ) Notice: Subject to any disclaimer, the term of this patent is extended or adjusted under 35 U.S.C. 154(b) by 729 days.

(21) Appl. No.: 12/360,974

(22) Filed: Jan. 28, 2009

(65) Prior Publication Data

US 2009/0196433 A1 Aug. 6, 2009

(30) Foreign Application Priority Data

Jan. 31, 2008 (JP) ................................. 2008-020276

(51) Int. Cl.
*H04B 15/00* (2006.01)

(52) U.S. Cl. ..................... 381/94.1; 381/94.2; 381/94.3; 381/95

(58) Field of Classification Search ................. 381/94.1, 381/94.2, 94.3, 95
See application file for complete search history.

(56) References Cited

U.S. PATENT DOCUMENTS

| | | | | |
|---|---|---|---|---|
| 5,442,715 | A | 8/1995 | Gaborski et al. | |
| 5,937,060 | A * | 8/1999 | Oh | 379/406.14 |
| 2004/0018860 | A1 | 1/2004 | Hoshuyama | |
| 2004/0091099 | A1 * | 5/2004 | Akie | 379/406.01 |
| 2004/0170284 | A1 | 9/2004 | Janse et al. | |
| 2008/0285774 | A1 * | 11/2008 | Kanamori et al. | 381/94.3 |

FOREIGN PATENT DOCUMENTS

| | | | |
|---|---|---|---|
| EP | 0 599 450 | A2 | 6/1994 |
| EP | 0 599 450 | A3 | 6/1994 |
| EP | 1 684 442 | A1 | 7/2006 |
| JP | 2004-056453 | A | 2/2004 |
| JP | 2006-217542 | | 8/2006 |
| WO | WO-03/010996 | A2 | 2/2003 |
| WO | WO-03/010996 | A3 | 2/2003 |
| WO | WO-2005/125272 | A1 | 12/2005 |
| WO | WO-2007/046070 | A1 | 4/2007 |

OTHER PUBLICATIONS

European Search Report mailed Aug. 12, 2009, for EP Application No. 09150514.9, seven pages.
Rombouts, Geert et al., "Proactive Notch Filtering for Acoustic Feedback Cancellation," Proceedings of SPS-DARTS 2006 (the 2006 second annual IEEE BENELUX/DSP Valley Signal Procesing Symposium) Jan. 2006, pp. 169-172.
Notification of Reasons for Refusal mailed Jul. 17, 2012, for JP Patent Application No. 2008-020276, with English Translation, seven pages.

* cited by examiner

*Primary Examiner* — Wai Sing Louie
(74) *Attorney, Agent, or Firm* — Morrison & Foerster LLP

(57) ABSTRACT

A howling suppression apparatus suppresses a howling caused in an acoustic system including a sound collection device and a sound emission device. An estimation part generates an estimated signal by estimating a feedback sound reaching the sound collection device from the sound emission device. An adjustment part generates an estimated signal by adjusting the estimated signal. A spectrum subtraction part generates an acoustic signal using a result of subtracting a frequency spectrum of the estimated signal from a frequency spectrum of an acoustic signal. A filter part generates an acoustic signal by suppressing a component of a frequency band including a howling frequency F among the acoustic signal. An acoustic signal in which the acoustic signal is amplified by an amplifier is supplied to the sound emission device.

6 Claims, 4 Drawing Sheets

HOWLING SUPPRESSION APPARATUS AND COMPUTER READABLE RECORDING MEDIUM

BACKGROUND OF THE INVENTION

The present invention relates to a technique for suppressing a howling.

Various techniques for suppressing a howling caused in an acoustic system including a sound collection device and a sound emission device have been proposed conventionally. For example, a howling suppression apparatus comprising an adaptive filter for generating a signal (hereinafter called an "estimated signal") in which acoustics (hereinafter called a "feedback sound") reaching a sound collection device from a sound emission device are estimated and a calculator for subtracting the estimated signal from an acoustic signal generated by the sound collection device in a time domain is disclosed in JP-A-2006-217542.

However, in the technique of JP-A-2006-217542, there are cases where a component which causes a howling cannot be eliminated from an acoustic signal completely. For example, when the acoustic signal differs from an estimated signal in a phase, a component (component which causes the howling) of a feedback sound remains in the acoustic signal after calculation by a calculator and the component circulates through an acoustic system and thereby, the howling increases cumulatively.

SUMMARY OF THE INVENTION

In consideration of the circumstances described above, an object of the invention is to effectively suppress a howling.

In order to solve the problem described above, a howling suppression apparatus of the invention is a howling suppression apparatus for suppressing a howling caused in an acoustic system including a sound collection device and a sound emission device, and comprises estimation means for generating an estimated signal by estimating a feedback sound reaching the sound collection device from the sound emission device, and spectrum subtraction means for subtracting a frequency spectrum (for example, a frequency spectrum of an estimated signal SS(z) in FIG. 1 or a frequency spectrum of an estimated signal RE(z) in FIG. 2 or FIG. 3) corresponding to the estimated signal from a frequency spectrum (for example, a frequency spectrum of an acoustic signal X2(*z*) in FIG. 1 or a frequency spectrum of an acoustic signal X1(*z*) in FIG. 2 or FIG. 3) of an acoustic signal reaching the sound emission device from the sound collection device.

In the configuration described above, an estimated signal in which a feedback sound is estimated is subtracted from an acoustic signal in a frequency domain, so that a feedback sound which causes a howling can effectively be suppressed from the acoustic signal, for example, even when the acoustic signal differs from the estimated signal (feedback sound) in a phase. In addition, the howling is a concept including a state in which intensity of the acoustic signal is actually increasing due to the feedback sound as well as a state in which the acoustic signal oscillates completely. Also, for example, means for generating a signal (an estimated signal) indicating a time waveform of the feedback sound or means for identifying frequency characteristics (a frequency spectrum) of the feedback sound is suitably adopted as the estimation means of the invention.

In a suitable aspect of the invention, the estimation means includes calculation means for subtracting an estimated signal from the acoustic signal, and an adaptive filter for identifying the estimated signal so as to minimize an acoustic signal (for example, an acoustic signal X2(*z*) of FIG. 1 or FIG. 2) after subtraction by the calculation means. According to the aspect described above, the adaptive filter is used in the estimation means, so that an estimated signal in which characteristics of a feedback sound are estimated with high accuracy can be generated. In addition, a target acoustic signal in which the spectrum subtraction means subtracts a frequency spectrum corresponding to the estimated signal may be any of an acoustic signal (for example, an acoustic signal X2(*z*) of FIG. 1) after subtraction and an acoustic signal (for example, an acoustic signal X1(*z*) of FIG. 2) before subtraction by the calculation means.

A howling suppression apparatus according to a suitable aspect of the invention comprises adjustment means for adjusting an estimated signal generated by the estimation means, and the spectrum subtraction means subtracts a frequency spectrum of the estimated signal (for example, an estimated signal SS(z) of FIG. 1) after adjustment by the adjustment means from a frequency spectrum of the acoustic signal. In the aspect described above, the estimated signal generated by the estimation means is adjusted by an adjustment part, so that by properly selecting an aspect of adjustment, a component of a feedback sound of the inside of the acoustic signal can be suppressed sufficiently (therefore, a howling is suppressed).

A howling suppression apparatus according to a suitable aspect of the invention comprises frequency identification means for identifying a howling frequency (frequency at which a howling is caused), and a filter for suppressing a component of a frequency band including the howling frequency among the acoustic signal (for example, acoustic signals X1(*z*) to X4(*z*) or an acoustic signal Y(z) in FIGS. 1 to 3). For example, when estimation of a feedback sound by estimation means cannot follow a sudden change in characteristics of an acoustic system, there is a possibility that a howling cannot be suppressed completely by only subtraction by spectrum subtraction means. According to the aspect described above, the component of the frequency band including the frequency at which the howling is actually caused among the acoustic signal is suppressed, so that the howling can be suppressed effectively even when the howling cannot be suppressed completely by only the subtraction by the spectrum subtraction means.

A howling suppression apparatus according to the invention is implemented by hardware (electronic circuit) such as a DSP (Digital Signal Processor) dedicated to processing of an acoustic signal and also, is implemented by cooperation of a program and a general-purpose arithmetic processing unit such as a CPU (Central Processing Unit). A computer readable recording medium according to the invention stores a program for suppressing a howling caused in an acoustic system including a sound collection device and a sound emission device, and makes a computer execute estimation processing for generating an estimated signal by estimating a feedback sound reaching the sound collection device from the sound emission device, and spectrum subtraction processing for subtracting a frequency spectrum corresponding to the estimated signal from a frequency spectrum of an acoustic signal reaching the sound emission device from the sound collection device. The computer readable recording medium described above also has an effect and action similar to those of a sound processor according to the invention. In addition, the computer readable recording medium of the invention is offered to a user in a form stored in a computer-readable record medium and is installed on a computer and further, is offered in a form of delivery through a communication network and is installed on a computer.

DETAILED DESCRIPTION OF PREFERRED EMBODIMENTS

A: Form of Sound Processor

Figure 1:
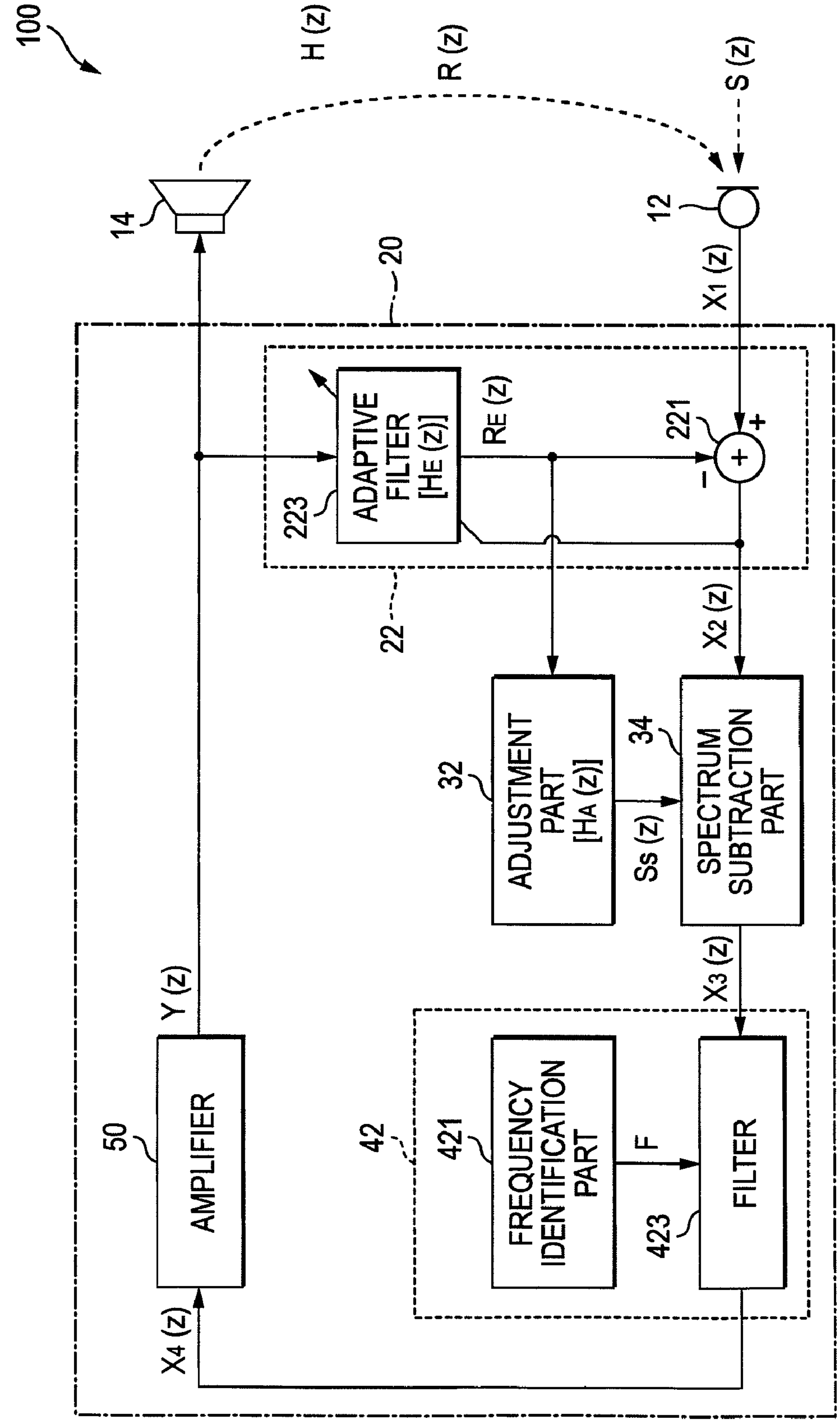
FIG. 1 is a block diagram of a loudspeaker according to a first embodiment of the invention.

FIG. 1 is a block diagram of a loudspeaker using a howling suppression apparatus according to a first embodiment of the invention. A loudspeaker 100 is an apparatus for adjusting sound volume of ambient acoustics (voice or musical sound) and emitting the acoustics, and comprises a sound collection device 12, a sound emission device 14 and a howling suppression apparatus 20. In addition, all the signals or acoustics are hereinafter represented as a component (argument z) of a frequency domain conveniently for simplicity of description.

The sound collection device (for example, a microphone) 12 generates an acoustic signal X1($z$) according to ambient acoustics and supplies the acoustic signal to the howling suppression apparatus 20. The howling suppression apparatus 20 generates an acoustic signal Y(z) and outputs the acoustic signal to the sound emission device 14. The sound emission device (for example, a speaker device) 14 emits sound waves according to the acoustic signal Y(z).

Apart of the sound waves emitted from the sound emission device 14 reaches the sound collection device 12 as a feedback sound. That is, the sound collection device 12 and the sound emission device 14 construct a loop-shaped acoustic system. Therefore, a howling is caused when a gain in the whole acoustic system exceeds 1. The howling suppression apparatus 20 generates the acoustic signal Y(z) by executing processing for suppressing a howling with respect to the acoustic signal X1($z$).

As shown in FIG. 1, the howling suppression apparatus 20 is a digital signal processor (DSP) comprising an estimation part 22, an adjustment part 32, a spectrum subtraction part 34, a filter part 42 and an amplifier 50. In addition, the howling suppression apparatus 20 is implemented by a central processing unit (CPU) which functions as each element of FIG. 1 by executing a program stored in a computer readable recording medium.

The acoustic signal X1($z$) generated by the sound collection device 12 is supplied to the estimation part 22. In addition, an output signal from the sound collection device 12 is actually converted into the digital acoustic signal X1($z$) through an A/D converter, but illustration of the A/D converter is omitted for convenience.

As shown in FIG. 1, a feedback sound in which transfer characteristics H(z) according to a path of sound waves from the sound emission device 14 to the sound collection device 12 are added to an emission sound (Y(z)) from the sound emission device 14 in addition to acoustics (hereinafter called an "amplified sound") targeted for sound amplification reach the sound collection device 12. Therefore, the acoustic signal X1($z$) supplied to the estimation part 22 corresponds to an addition of a signal S(z) corresponding to the amplified sound and a feedback sound signal R(z) (R(z)=H(z)•Y(z)) corresponding to the feedback sound as shown in the following formula (1).

$$\begin{aligned} X1(z) &= S(z) + R(z) \\ &= S(z) + H(z)\cdot Y(z) \end{aligned} \quad (1)$$

The estimation part 22 generates an estimated signal RE(z) in which the feedback sound signal R(z) is simulated by estimating the feedback sound (R(z)) reaching the sound collection device 12 from the sound emission device 14. The estimation part 22 of the embodiment is constructed of a calculation part 221 and an adaptive filter 223. The calculation part 221 generates an acoustic signal X2($z$) by subtracting the estimated signal RE(z) from the acoustic signal X1($z$). The acoustic signal X2($z$) outputted by the calculation part 221 and the acoustic signal Y(z) (or a signal in which the acoustic signal Y(z) is delayed) supplied to the sound emission device 14 are supplied to the adaptive filter 223. The adaptive filter 223 identifies the estimated signal RE(z) so as to minimize intensity of the acoustic signal X2($z$). More specifically, the adaptive filter 223 sets a transfer function HE(z) in which a transfer function H(z) of a path of the feedback sound is estimated by occasionally adjusting plural filter factors according to the acoustic signal X2($z$) computed by the calculation part 221 and the acoustic signal Y(z) supplied to the sound emission device 14, and generates the estimated signal RE(z) (RE(z)=HE(z)•Y(z)) by multiplying the acoustic signal Y(z) by the transfer function HE(z). Therefore, the acoustic signal X2($z$) is expressed by the following formula (2).

$$\begin{aligned} X2(z) &= X1(z) - RE(z) \\ &= X1(z) - HE(z)\cdot Y(z) \end{aligned} \quad (2)$$

The acoustic signal X2($z$) is generated by subtracting the estimated signal RE(z) from the acoustic signal X1($z$) as shown in the formula (2), and a component of the feedback sound signal R(z) may remain in the acoustic signal X2($z$). For example, subtraction by the calculation part 221 is actually executed in a time domain, so that even when the estimated signal RE(z) sufficiently approximates to the feedback sound signal R(z), the component of the feedback sound signal R(z) remains in the acoustic signal X2($z$) when a phase between the acoustic signal X1($z$) and the estimated signal RE(z) differs. In a conventional configuration in which the component of the feedback sound signal R(z) remaining in the acoustic signal X2($z$) circulates through an acoustic system constructed of the sound emission device 14 and the sound collection device 12, the component increases cumulatively and a howling is caused.

The adjustment part 32 and the spectrum subtraction part 34 of FIG. 1 are means for suppressing the feedback sound signal R(z) remaining in the acoustic signal X2($z$). The adjustment part 32 generates an estimated signal SS(z) corresponding to the estimated signal RE(z) by adjusting the estimated signal RE(z) generated by the adaptive filter 223. The estimated signal SS(z) is expressed by the following formula (3) including a transfer function HA(z) of the adjustment part 32.

$$SS(z)=HA(z)\bullet RE(z) \quad (3)$$

The spectrum subtraction part 34 generates an acoustic signal X3($z$) by subtracting the estimated signal SS(z) according to the estimated signal RE(z) from the acoustic signal X2($z$) in a frequency domain (spectrum subtraction). More specifically, the spectrum subtraction part 34 generates the acoustic signal X3($z$) by setting a frequency spectrum generated by subtracting a frequency spectrum (an amplitude spectrum or a power spectrum) of the estimated signal SS(z) from a frequency spectrum (an amplitude spectrum or a power spectrum) of the acoustic signal X2($z$) as an amplitude spectrum of the acoustic signal X2($z$) as shown in the following formula (4).

$$\begin{aligned} X3(z) &= X2(z)(|X2(z)|^2 - |Ss(z)|^2)/|X2(z)|^2 \qquad (4)\\ &= X2(z)(|X2(z)|^2 - |HA(z)\cdot RE(z)|^2)/|X2(z)|^2\\ &= X2(z)(|X2(z)|^2 - |HA(z)\cdot HE(z)\cdot Y(z)|^2)/|X2(z)|^2 \end{aligned}$$

Since the acoustic signal X2($z$) is a signal in which the estimated signal RE(z) is subtracted from the acoustic signal X1($z$) (formula (1)), suppression of the estimated signal RE(z) (feedback sound signal R(z)) in the acoustic signal X2($z$) becomes excess when the spectrum subtraction part 34 subtracts a frequency spectrum of the estimated signal RE(z) from a frequency spectrum of the acoustic signal X2($z$). Hence, the adjustment part 32 generates the estimated signal SS(z) by decreasing intensity of the estimated signal RE(z). Therefore, a multiplier in which the estimated signal RE(z) is multiplied by a predetermined positive number (for example, less than 1) is suitably adopted as the adjustment part 32. By properly adjusting the transfer function HA(z) of the adjustment part 32 as described above, the component of the feedback sound signal R(z) remaining in the acoustic signal X2($z$) can be suppressed sufficiently. In addition, the adjustment part 32 may execute processing for delaying the estimated signal RE(z) in addition to adjustment of the intensity of the estimated signal RE(z).

By the way, a persistent component by which a howling is caused among the feedback sound is surely suppressed by action of the spectrum subtraction part 34 and the calculation part 221. However, for example, when characteristics (particularly, the transfer function H(z)) of the acoustic system change suddenly, estimation of the adaptive filter 223 cannot follow a change in the characteristics sufficiently (a difference between the estimated signal RE(z) and the feedback sound signal R(z) increases), so that suppression of the feedback sound signal R(z) becomes insufficient and a howling may be caused. The filter part 42 of FIG. 1 is means for suppressing a component by which the howling is actually caused among the acoustic signal X3($z$).

The filter part 42 comprises a frequency identification part 421 and a filter 423. The frequency identification part 421 identifies a frequency (hereinafter called a "howling frequency") F at which a howling is caused. A publicly known technique is arbitrarily adopted in identification of the howling frequency F. For example, means for identifying the howling frequency F by detecting the peak of a frequency spectrum of the acoustic signal X2($z$) or means for identifying the howling frequency F from intensity of each component in which the acoustic signal X2($z$) is separated into plural frequency bands is suitable as the frequency identification part 421.

The filter 423 generates an acoustic signal X4($z$) by suppressing a component of a frequency band including the howling frequency F identified by the frequency identification part 421 among the acoustic signal X3($z$) after processing by the spectrum subtraction part 34. For example, a notch filter for variably controlling frequency characteristics so as to attenuate a narrow band component centering on the howling frequency F among the acoustic signal X3($z$) is suitable as the filter 423. In addition, the howling frequency F is not identified in a situation in which a howling is not caused, so that the filter 423 passes all the components of the acoustic signal X3($z$) as the acoustic signal X4($z$).

The amplifier 50 generates an acoustic signal Y(z) by amplifying the acoustic signal X4($z$) generated by the filter part 42. A gain of the amplifier 50 is variably controlled according to instructions from, for example, a user. The acoustic signal Y(z) outputted by the amplifier 50 is supplied to the sound emission device 14 and is emitted as sound waves and also is supplied to the estimation part 22 (adaptive filter 223) and is used in generation of the estimated signal RE(z). In addition, the acoustic signal Y(z) outputted by the amplifier 50 is actually supplied to the sound emission device 14 after the acoustic signal Y(z) is converted into an analog signal through a D/A converter, but illustration of the D/A converter is omitted for convenience.

In the embodiment described above, the estimated signal SS(z) is subtracted from the acoustic signal X2($z$) in a frequency domain, so that even when a phase between the acoustic signal X2($z$) and the estimated signal RE(z) (the estimated signal SS(z)) differs, the feedback sound signal R(z) of the inside of the acoustic signal X2($z$) is suppressed sufficiently. Therefore, a howling can be suppressed effectively as compared with the case of suppressing the howling by only a configuration of subtracting the estimated signal RE(z) from the acoustic signal X1($z$) in a time domain.

By the way, as a technique for executing a subtraction between signals in a frequency domain, a method (spectrum subtraction) for suppressing noise by subtracting a frequency spectrum of noise from a frequency spectrum of an acoustic signal has been proposed conventionally. Since the frequency spectrum of noise is estimated using, for example, a silent interval (an interval at which a target sound is not present) among the acoustic signal, the frequency spectrum of noise subtracted from the acoustic signal does not completely match with the frequency spectrum of noise at an interval at which the target sound is present among the acoustic signal. Therefore, there is a problem that a component of noise remaining after subtraction of the frequency spectrum is perceived as harsh musical noise by an audience.

In the embodiment, a feedback sound (feedback sound signal R(z)) is estimated with high accuracy by using the adaptive filter 223, so that musical noise which becomes a problem in the case of subtracting a frequency spectrum of noise from a silent interval of an acoustic signal is resistant to occurrence. Also, the feedback sound signal R(z) approximates to a signal S(z) of an amplified sound, so that there is an advantage that noise such as the musical noise is hardly recognized by an audience even when a component of the feedback sound signal R(z) remains in the acoustic signal X4($z$).

B: Second Embodiment

Figure 2:
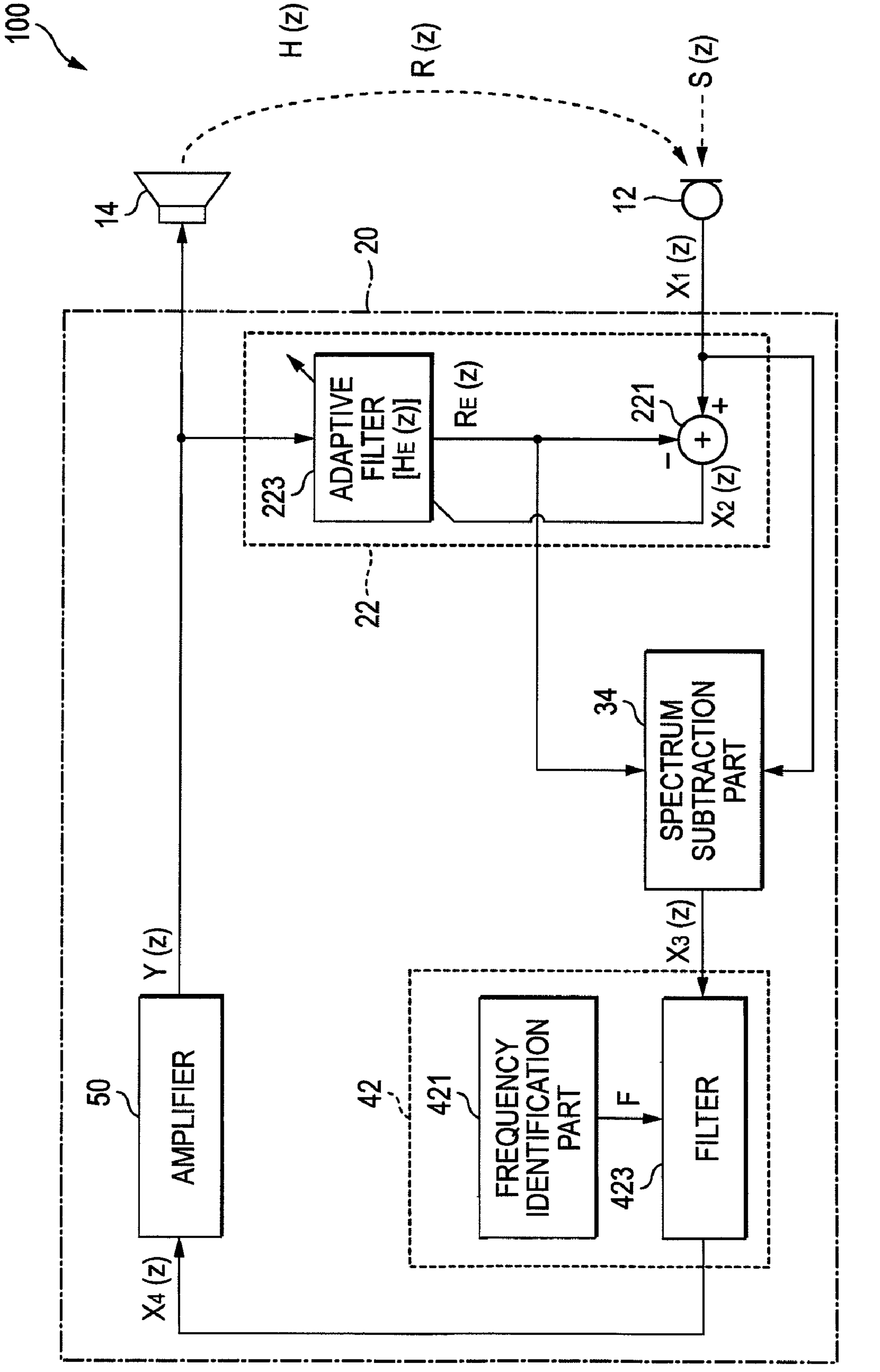
FIG. 2 is a block diagram of a loudspeaker according to a second embodiment of the invention.

FIG. 2 is a block diagram of a loudspeaker 100 using a howling suppression apparatus 20 according to a second embodiment of the invention. In addition, each detailed description is properly omitted by assigning the same numerals as those described above to elements whose actions or functions are equal to those of the first embodiment in each of the following embodiments.

As shown in FIG. 2, an acoustic signal X1(*z*) generated by a sound collection device 12 is supplied to an estimation part 22 (calculation part 221) and a spectrum subtraction part 34. An acoustic signal X2(*z*) generated by the calculation part 221 is not supplied to the spectrum subtraction part 34. That is, the acoustic signal X2(*z*) is used in only generation (estimation of a feedback sound) of an estimated signal RE(z) by an adaptive filter 223 and is not used in suppression of a feedback sound signal R(z) by the spectrum subtraction part 34. The spectrum subtraction part 34 generates an acoustic signal X3(*z*) using a result of subtracting a frequency spectrum of the estimated signal RE(z) generated by the adaptive filter 223 from a frequency spectrum of the acoustic signal X1(*z*).

Since the estimated signal RE(z) is a signal in which the feedback sound signal R(z) is estimated, the feedback sound signal R(z) can be suppressed by subtracting the frequency spectrum of the estimated signal RE(z) from the frequency spectrum of the acoustic signal X1(*z*) by the spectrum subtraction part 34 in a manner similar to the first embodiment. Therefore, an effect similar to that of the first embodiment is achieved also in the present embodiment. In addition, a configuration in which an adjustment part 32 for generating an estimated signal SS(z) by adjusting the estimated signal RE(z) is arranged between the spectrum subtraction part 34 and the adaptive filter 223 of FIG. 2 and the spectrum subtraction part 34 subtracts the estimated signal SS(z) from the acoustic signal X1(*z*) is also adopted.

C: Third Embodiment

Figure 3:
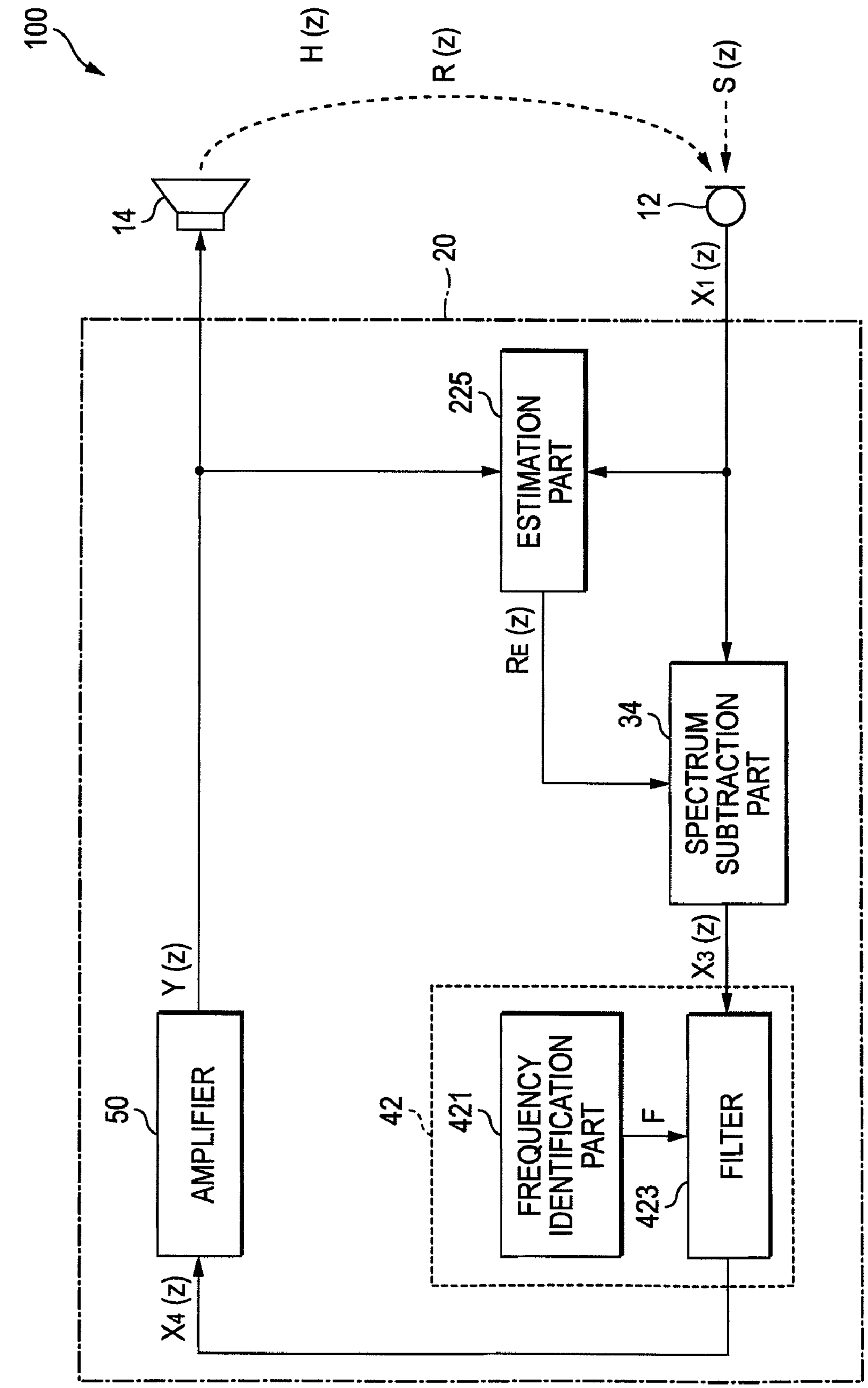
FIG. 3 is a block diagram of a loudspeaker according to a third embodiment of the invention.

FIG. 3 is a block diagram of a loudspeaker 100 using a howling suppression apparatus 20 according to a third embodiment of the invention. The howling suppression apparatus 20 of FIG. 3 comprises an estimation part 225 instead of the estimation part 22 of FIG. 2. The estimation part 225 generates an estimated signal RE(z) based on an acoustic signal X1(*z*) generated by a sound collection device 12 and an acoustic signal Y(z) outputted by an amplifier 50 in a manner similar to the estimation part 22.

The following formula (5) is derived from a definition (R(z)=H(z)•Y(z)) of a feedback sound signal R(z). In addition, a symbol "*" means a complex conjugate.

$$H(z)=\{Y^*(z)\bullet R(z)\}/\{Y^*(z)\bullet Y(z)\} \quad (5)$$

In the case of focusing attention on only a short interval of the feedback sound signal R(z) or the acoustic signal X1(*z*), characteristics of the feedback sound signal R(z) and the acoustic signal X1(*z*) differ. However, the feedback sound signal R(z) is a signal generated from the acoustic signal X1(*z*), so that an addition of the acoustic signals X1(*z*) over a sufficiently long time length approximates to a product (or average) of the feedback sound signals R(z) over a sufficiently long time length. Therefore, a transfer function H(z) of the formula (5) is approximately estimated as a transfer function HE(z) of the following formula (6) by using the known acoustic signal X1(*z*) instead of the unknown feedback sound signal R(z). In addition, a symbol "Σ" in the formula (6) means an addition (or average) over a time of the extent to which an addition of the feedback sound signals R(z) sufficiently approximates to an addition of the acoustic signals X1(*z*).

$$HE(z)=\{\Sigma(Y^*(z)\bullet X1(z))\}/\{\Sigma(Y^*(z)\bullet Y(z))\} \quad (6)$$

The estimation part 225 of FIG. 3 computes the estimated signal RE(z) (RE(z)=HE(z)•Y(z)) by multiplying the acoustic signal. Y(z) by the transfer function HE(z) while executing computation (that is, estimation of the transfer function H(z)) of the transfer function HE(z) based on the formula (6) from the acoustic signals X1(*z*) and the acoustic signal Y(z). The estimated signal RE(z) corresponds to a signal in which the feedback sound signal R(z) is estimated.

A spectrum subtraction part 34 generates an acoustic signal X3(*z*) by subtracting a frequency spectrum of the estimated signal RE(z) from a frequency spectrum of the acoustic signal X1(*z*) Therefore, an effect similar to that of the first embodiment is achieved. As described above, the adaptive filter 223 is not indispensable for estimation of the estimated signal RE(z). In addition, a configuration in which an adjustment part 32 for adjusting the estimated signal RE(z) to an estimated signal SS(z) is arranged between the spectrum subtraction part 34 and the estimation part 225 of FIG. 3 and the spectrum subtraction part 34 subtracts a frequency spectrum of the estimated signal SS(z) from a frequency spectrum of the acoustic signal X1(*z*) is also adopted.

D: Modified Example

Various modifications as illustrated below can be made in each of the embodiments described above. In addition, two or more aspects may arbitrarily be selected and combined from the following illustrations.

(1) Modified Example 1

A position (point in time) in which each signal (an acoustic signal or an estimated signal) used in a howling suppression apparatus 20 is converted from one of a time domain and a frequency domain to the other is arbitrary. In the first embodiment, for example, an acoustic signal X2(*z*) is converted from the time domain to the frequency domain (for example, a Fourier transform or a wavelet transform) and an estimated signal SS(z) or an estimated signal RE(z) is converted from the time domain to the frequency domain. In the second embodiment or the third embodiment, for example, an acoustic signal X1(*z*) is converted from the time domain to the frequency domain. Also, in the first embodiment to the third embodiment, an acoustic signal X3(*z*) or an acoustic signal X4(*z*) is converted from the frequency domain to the time domain (for example, an inverse Fourier transform or an inverse wavelet transform). As can be seen from the above description, a configuration of executing subtraction by a spectrum subtraction part 34 in the frequency domain is suitably adopted in the invention.

(2) Modified Example 2

A method for generating an estimated signal RE(z) (a method for estimating a feedback sound) is not limited to the illustrations described above. For example, when a transfer function H(z) of a path from a sound emission device 14 to a sound collection device 12 is known, the estimated signal RE(z) is generated by multiplying an acoustic signal Y(z) outputted by an amplifier 50 by the transfer function H(z).

(3) Modified Example 3

Figure 4:
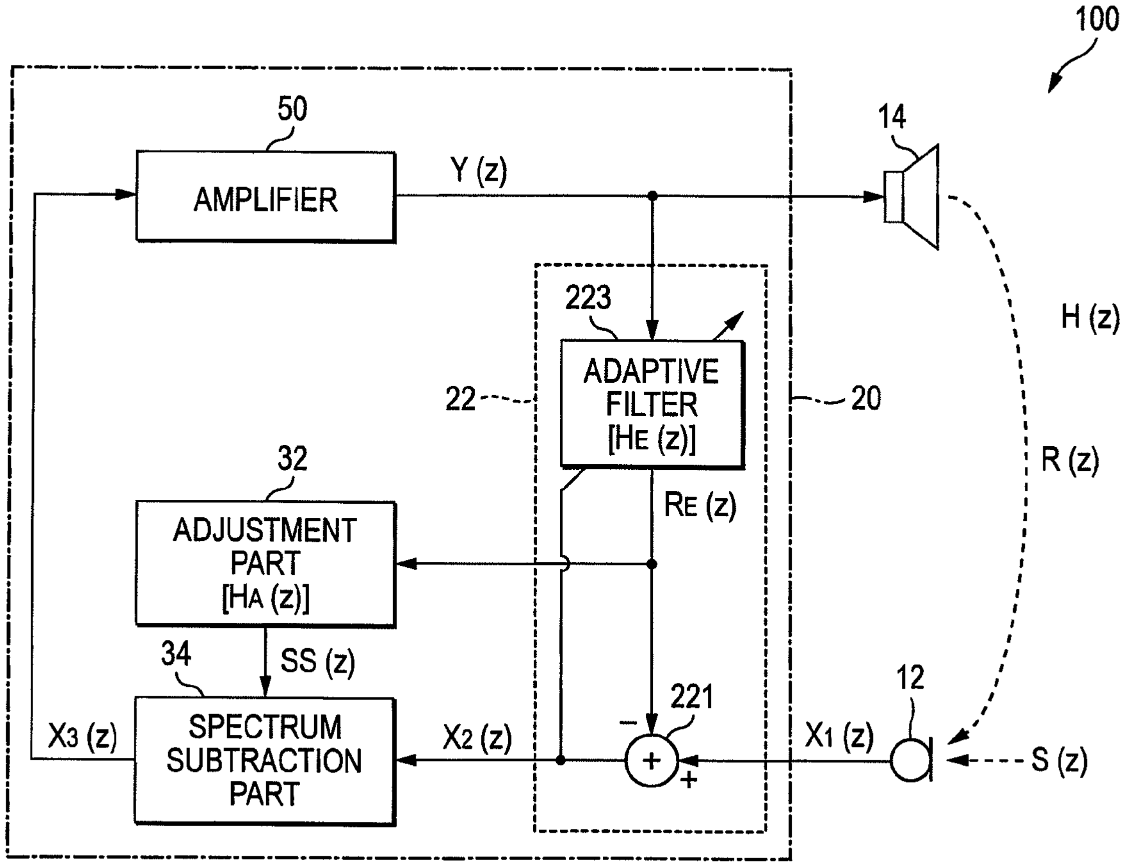
FIG. 4 is a block diagram of a loudspeaker according to a modified example.

The filter part 42 in each of the embodiments described above is omitted. For example, in an aspect in which the filter part 42 of FIG. 1 is omitted, an acoustic signal X3(*z*) is supplied from a spectrum subtraction part 34 to an amplifier 50 as shown in FIG. 4. This similarly applies to the configuration of FIG. 2 or FIG. 3. Further, a position of the filter part 42 in each of the embodiments described above is changed properly. For example, the filter part 42 may be arranged between a sound collection device 12 and an estimation part 22 (or an estimation part 225).

Also, a method for identifying a howling frequency F in the filter part 42 is arbitrary. For example, in each of the embodiments described above, the howling frequency F is identified based on the acoustic signal X2(*z*), but the howling frequency F can also be identified using acoustic signals (X1(*z*), X3(*z*), X4(*z*), Y(z)) at any stage. Also, a configuration of identifying the howling frequency F based on plural filter factors (or a transfer function HE(z) or an estimated signal RE(z) or an estimated signal SS(z)) set by an adaptive filter 223 is adopted.

(4) Modified Example 4

A configuration of distributing a howling suppression apparatus 20 into plural apparatuses is also adopted. For example, an amplifier 50 is formed in an apparatus different from other elements. Also, a part of the howling suppression apparatus 20 may be implemented by a dedicated electronic circuit (DSP) and also the other part may be implemented by cooperation of a central processing unit and a program.

What is claimed is:

1. A howling suppression apparatus for suppressing a howling caused in an acoustic system including a sound collection device and a sound emission device, the howling suppression apparatus comprising:

an estimation unit which estimates a feedback sound reaching the sound collection device from the sound emission device;

a spectrum subtraction unit which subtracts a frequency spectrum, corresponding to a feedback sound estimated by the estimation unit, from a frequency spectrum of an acoustic signal reaching the sound emission device from the sound collection device; and an adjustment unit which adjusts a feedback sound estimated by the estimation unit, wherein the spectrum subtraction unit subtracts a frequency spectrum, subjected to adjustment by the adjustment unit, from the frequency spectrum of the acoustic signal.

2. The howling suppression apparatus according to claim 1, wherein the estimation unit includes a calculation unit which subtracts an estimated signal indicating the feedback sound from the acoustic signal, and an adaptive filter which identifies the estimated signal so as to minimize an acoustic signal output from the calculation unit.

3. The howling suppression apparatus according to claim 2, wherein the spectrum subtraction unit subtracts the frequency spectrum, corresponding to the estimated signal, from a frequency spectrum of the acoustic signal output from the calculation unit.

4. The howling suppression apparatus according to claim 2, wherein the spectrum subtraction unit subtracts the frequency spectrum, corresponding to the estimated signal, from a frequency spectrum of the acoustic signal before subjected to subtraction by the calculation unit.

5. The howling suppression apparatus according to claim 1, comprising a frequency identification unit which identifies a howling frequency, and a filter which suppresses a component of a frequency band including the howling frequency among the acoustic signal.

6. A computer readable recording medium which stores a program for suppressing a howling caused in an acoustic system including a sound collection device and a sound emission device, the program causing a computer to execute:

estimation processing for estimating a feedback sound reaching the sound collection device from the sound emission device;

spectrum subtraction processing for subtracting a frequency spectrum, corresponding to a feedback sound estimated by the estimation unit, from a frequency spectrum of an acoustic signal reaching the sound emission device from the sound collection device; and adjustment processing for adjusting a feedback sound estimated by the estimation processing, wherein the spectrum subtraction processing subtracts a frequency spectrum, subjected to adjustment by the adjustment processing, from the frequency spectrum of the acoustic signal.

* * * * *